United States Patent [19]
Tamaru et al.

[11] Patent Number: 4,627,037
[45] Date of Patent: Dec. 2, 1986

[54] DISC REPRODUCING APPARATUS

[75] Inventors: Takuya Tamaru, Hamakita; Mikio Ogusu, Hamamatsu, both of Japan

[73] Assignee: Nippon Gakki Seizo Kabushiki Kaisha, Hamamatsu, Japan

[21] Appl. No.: 721,666

[22] Filed: Apr. 10, 1985

[30] Foreign Application Priority Data

| Apr. 12, 1984 [JP] | Japan | 59-73583 |
| May 15, 1984 [JP] | Japan | 59-70478[U] |
| Jun. 1, 1984 [JP] | Japan | 59-81525[U] |

[51] Int. Cl.⁴ ............................................. G11B 23/02
[52] U.S. Cl. ................................ 369/77.2; 206/309; 369/75.2; 369/270; 369/291
[58] Field of Search .............. 369/77.2, 291, 270, 369/271, 75.2; 206/309, 312, 313, 444, 303, 591; 360/133

[56] References Cited

U.S. PATENT DOCUMENTS

| 4,320,425 | 3/1982 | Hall | 360/133 |
| 4,426,695 | 1/1984 | Moriki et al. | 369/77.2 |
| 4,477,894 | 10/1984 | Clurman | 369/291 |
| 4,535,434 | 8/1985 | Kishi | 369/291 |
| 4,539,613 | 9/1985 | Suyama et al. | 360/133 |

FOREIGN PATENT DOCUMENTS 32771   7/1981   European Pat. Off. ............ 369/291

Primary Examiner—Steven L. Stephan
Attorney, Agent, or Firm—Cushman, Darby & Cushman

[57] ABSTRACT

A disc reproducing apparatus for reproducing a disc which is received in a disc case, and on which optical information data are recorded. The disc case can be set into the reproducing apparatus with the disc received in the disc case. When set into the reproducing apparatus, while the disc case is fixed in position within the reproducing apparatus, the disc is driven in rotation and thus the optical information data are reproduced by the reproducing apparatus.

11 Claims, 29 Drawing Figures

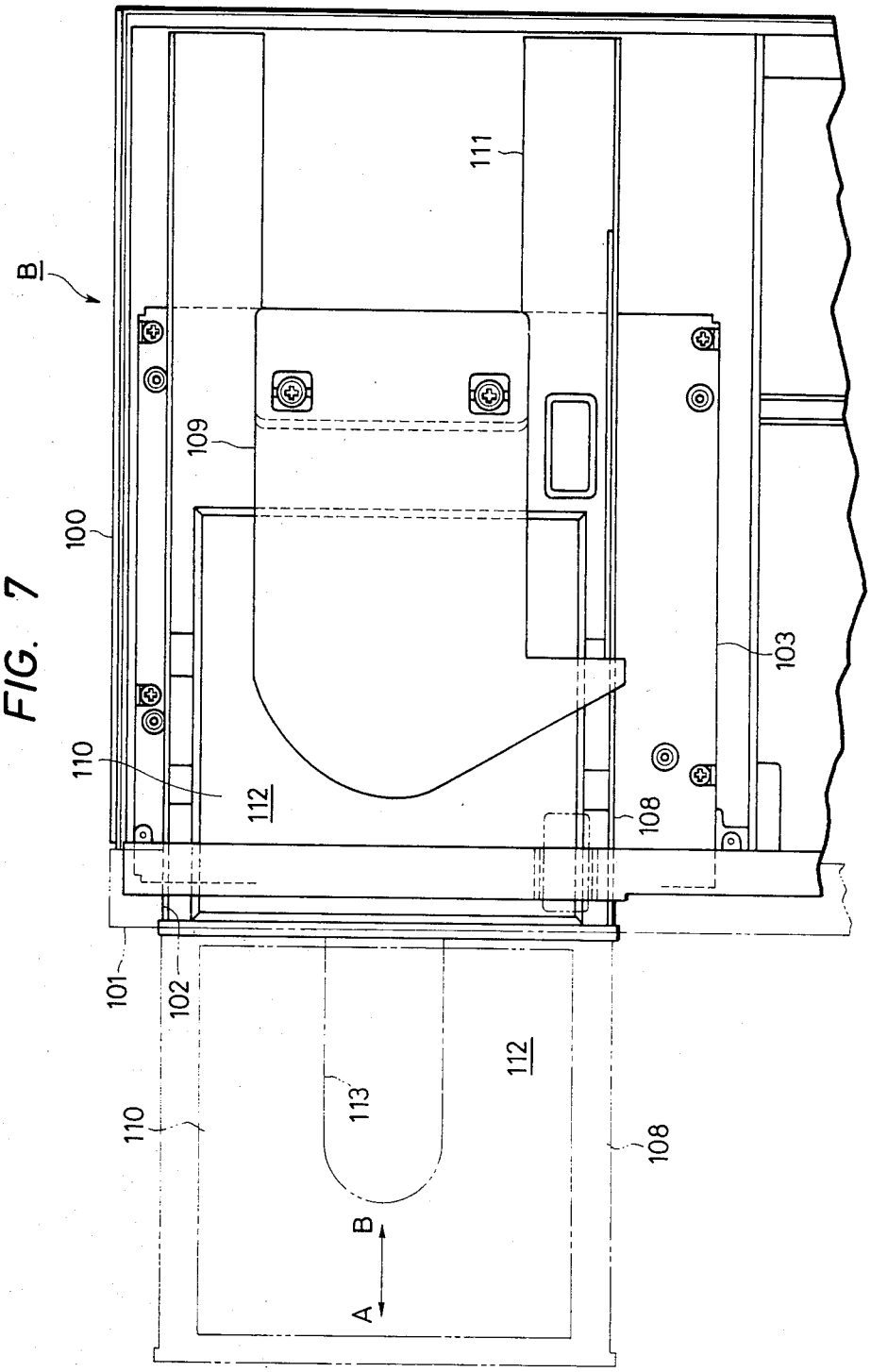

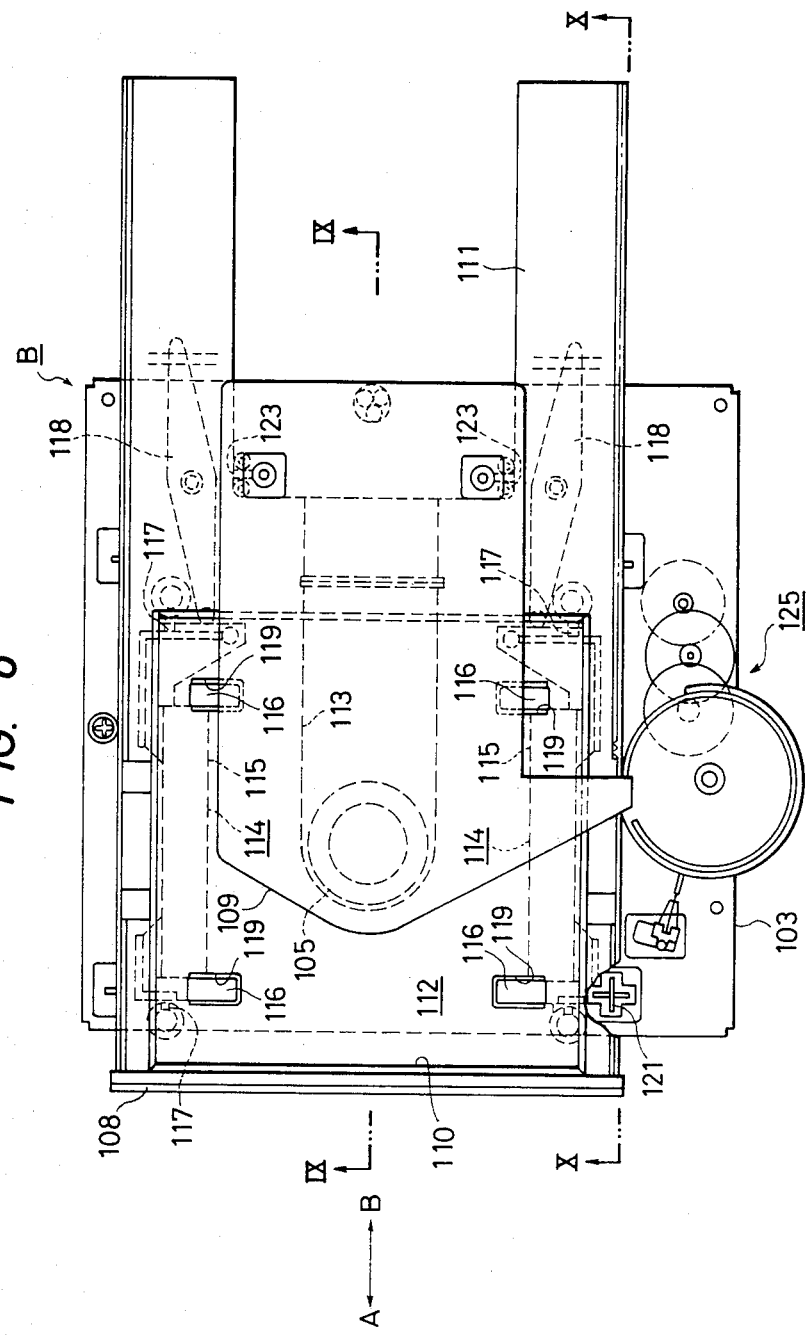

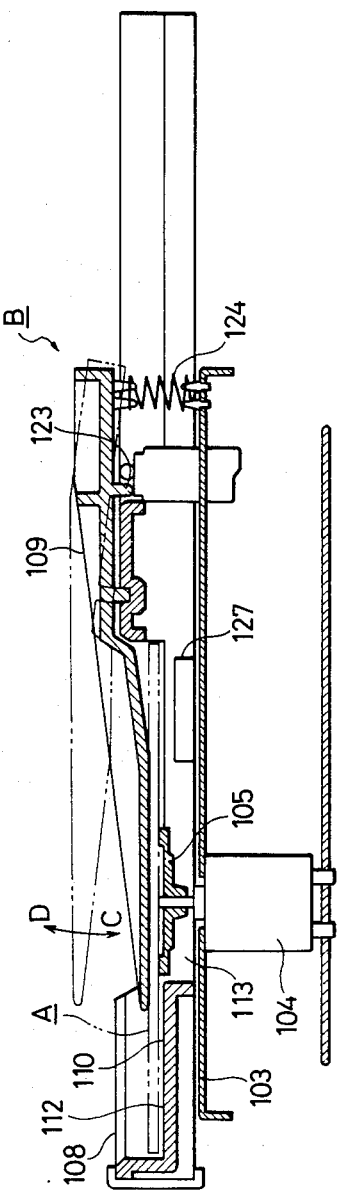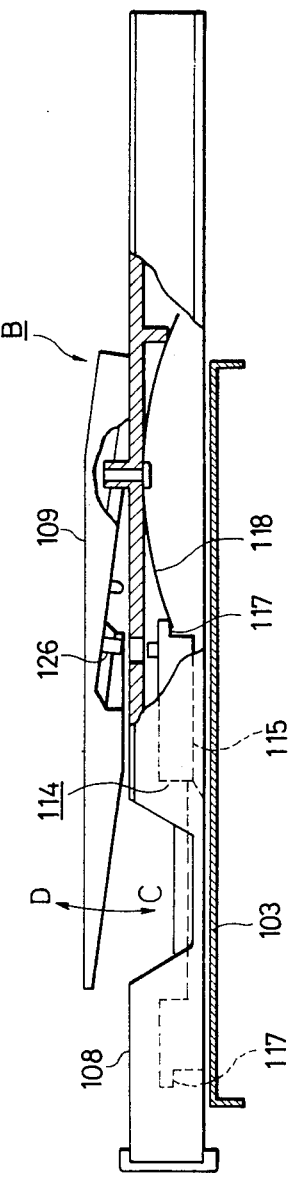

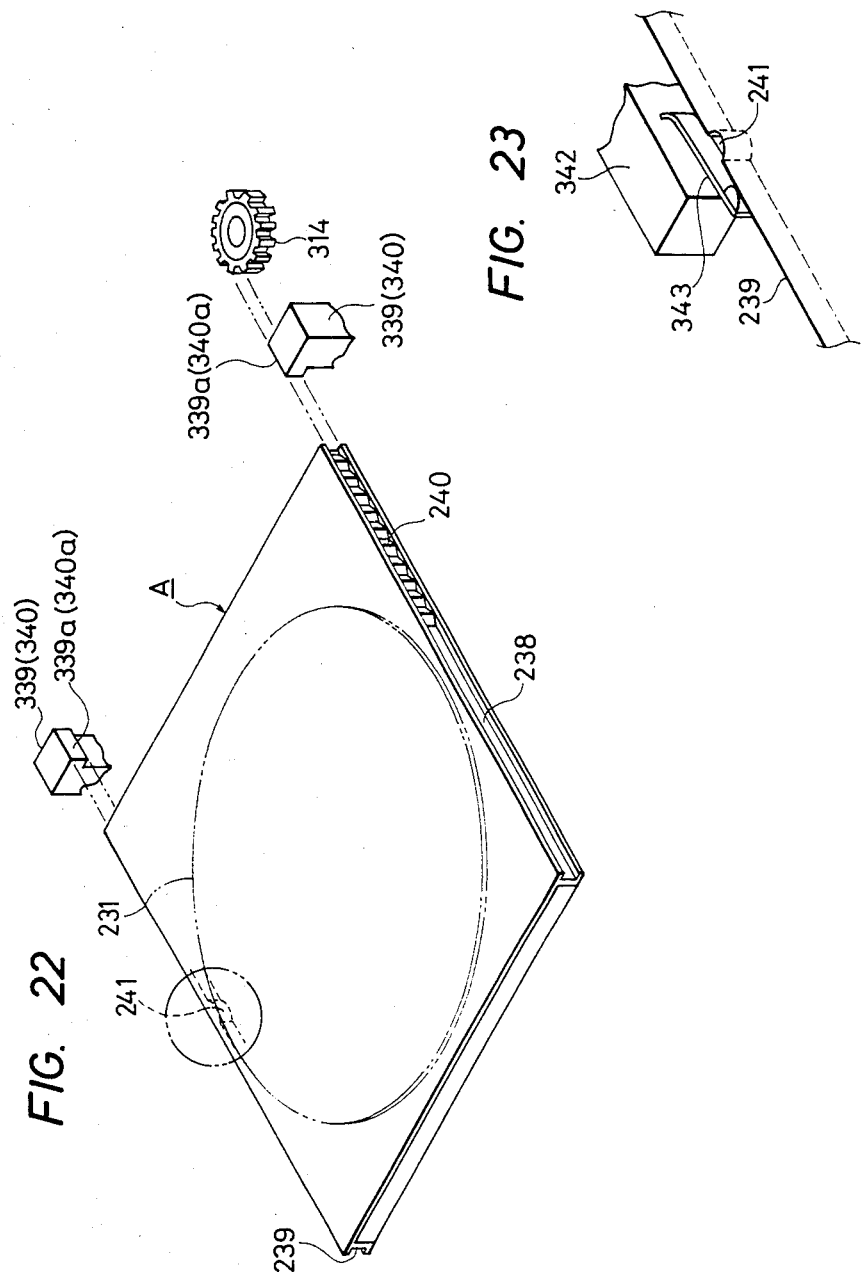

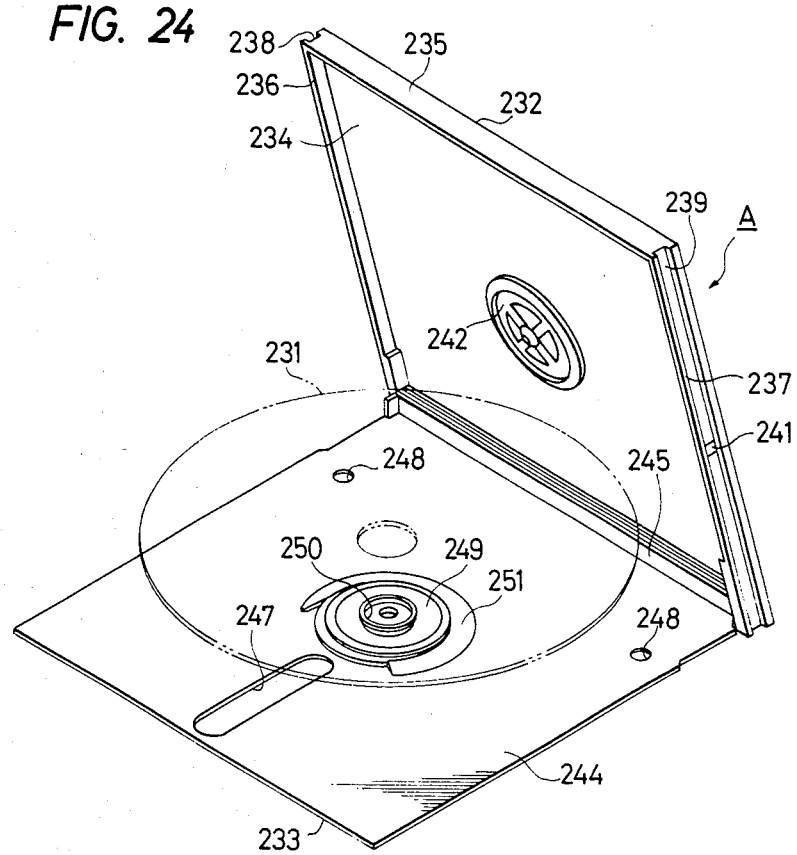
FIG. 24
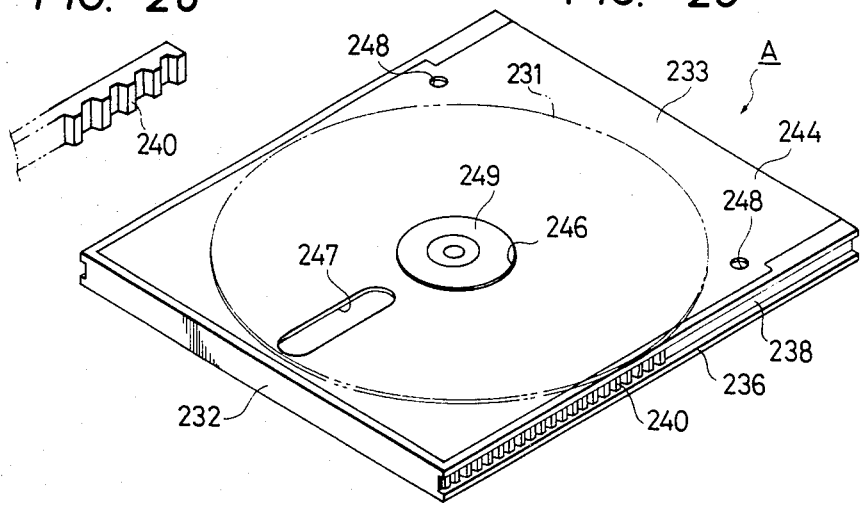
FIG. 26
FIG. 25

4,627,037

DISC REPRODUCING APPARATUS

BACKGROUND OF THE INVENTION (a) Field of the Invention

This invention relates to a disc reproducing apparatus used to reproduce such discs as compact discs of the Compact Disc digital audio system and more particularly to a disc reproducing apparatus for reproducing the disc on which optical information data are recorded, and which is received in a disc case, the disc case being able to be set into the reproducing apparatus with the disc received in the disc case (b) Description of the Prior Art A conventional disc reproducing apparatus shall be explained with reference to a compact disc player of the Compact Disc digital audio system. In reproducing the disc by the conventional compact disc player, the disc is taken out of a preserving case or jacket and then is loaded to the player as naked. Therefore, since the disc itself is handled directly with hands and is therefore set as naked in the player, various problems will be caused.

For example, in case the compact disc player is used as mounted on a car, if the driver wants to reproduce the disc, as one hand is used to operate the handle, the disc will be handled with only the other hand. Thus, all with only the other hand, the disc will be put into and out of the case and the player will be loaded and unloaded with the disc. There are problems that, in case the disc is thus handled directly with one hand, an unexpected external force will be applied to the disc and a finger print will be deposited on the surface of the disc. There is another problem that, for example, as the car body interior is dusty and is high in the temperature, in case the player is loaded with the disc as naked, the disc will be subjected to a very severe condition.

In the floppy disc reproducing system adopted in office automation equipment, a floppy disc is contained in a protective case and the reproducing apparatus is loaded with the disc together with the protective case in reproducing the disc. In this system, as the disc is handled always together with the protective case, such problem as depositing a finger print on the disc can be prevented and the disc can be protected. However, in this system, there is a disadvantage that the disc is unremovably contained within the protective case and therefore can not be replaced. Many reproducing apparatus must be loaded with the protective case containing the disc mostly by insertion with a human hand, but, in fact, no system satisfactory in the operatability and usability has been provided. Further, there has been a defect that the conventional automatic loading mechanism of this kind of operation is all provided on the reproducing apparatus side and is therefore very complicated in realizing the automatic loading function.

SUMMARY OF THE INVENTION

An object of the present invention is to provide a disc reproducing apparatus which can protect the disc from the finger print deposition, dust and temperature.

Another object of the present invention is to provide a disc reproducing apparatus provided with an automatic loading mechanism of a disc case containing a disc with a simple construction.

The other object of the present invention is to provide a disc reproducing apparatus which can be loaded with a disc case containing a disc exactly in a predetermined position.

According to the present invention, as the disc is reproduced by loading the reproducing apparatus with a disc case containing the disc, the disc is handled as contained in the disc case and therefore can be protected from the finger print deposition, external force, dust and temperature. Further, as an automatic loading mechanism for loading the reproducing apparatus with the disc case, there is provided a disc case carrying mechanism enabling the relative movement between the disc case and reproducing apparatus to obtain an automatic loading mechanism with a simple construction. Further, as there is provided a disc case position sensor for detecting that the disc cases in a predetermined position in loading the reproducing apparatus, the disc case can be set exactly in the predetermined position.

This and other objects of the present invention will become more apparent during the course of the following detailed description and appended claims.

BRIEF DESCRIPTION OF THE DRAWINGS

FIG. 7 is a schematic plan view showing an important part of the reproducing apparatus.

FIG. 8 is a plan view showing in detail the important part in FIG. 7.

FIG. 9 is a sectional view along line IX—IX in FIG. 8.

FIG. 10 is a sectional view along line X—X in FIG. 8.

FIG. 22 is a view showing the relative positions of the disc case, guide member and pinion.

FIG. 23 is a view showing the relative positions of the microswitch and disc case.

FIG. 24 is a perspective view of the disc case as opened.

FIG. 25 is a perspective view showing the back surface of the disc case.

FIG. 26 is an enlarged perspective view of a rack part of the disc case.

DESCRIPTION OF THE PREFERRED EMBODIMENTS

Figure 1:
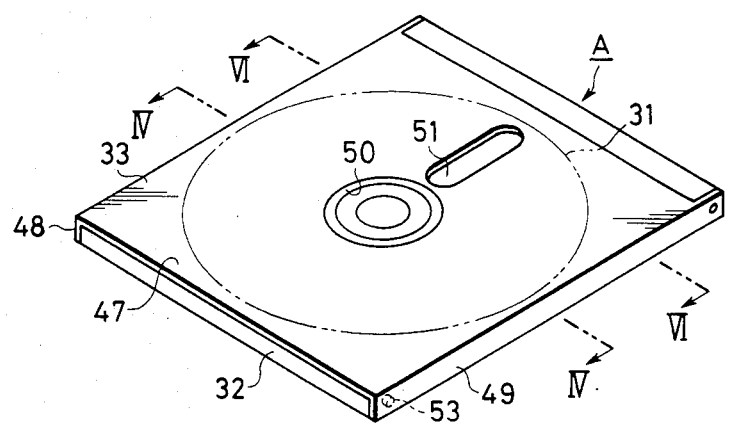
FIG. 1 is a perspective view showing the back surface of a disc case which is utilized in relation to a disc producing apparatus of the present invention.
Figure 2:
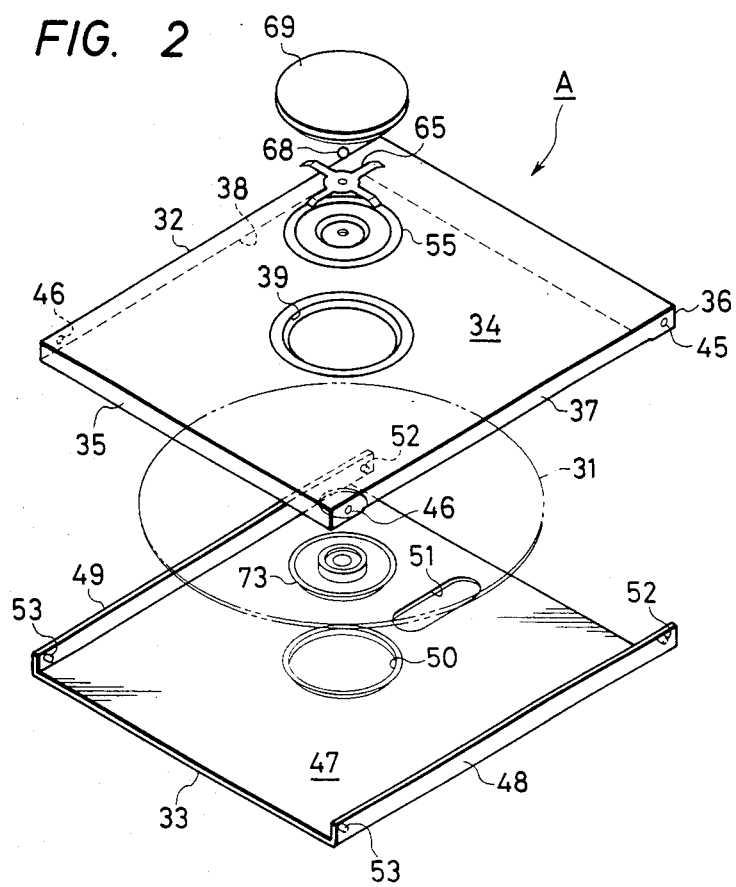
FIG. 2 is an exploded perspective view of the disc case in FIG. 1.
Figure 3:
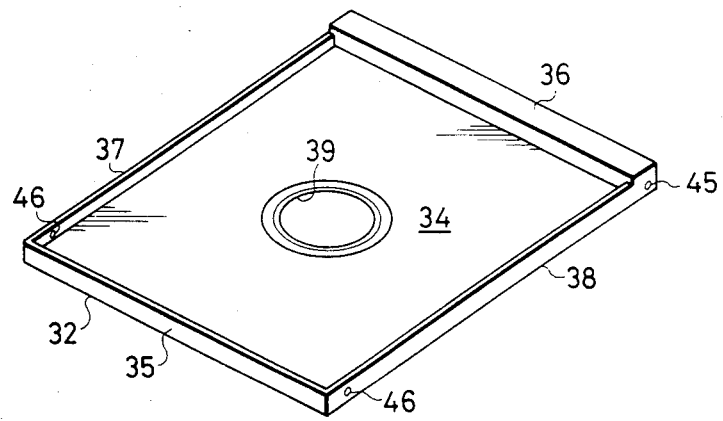
FIG. 3 is a perspective view showing the back surface of the upper case in FIG. 2.

The present invention shall be explained in the following on the basis of the embodiments as applied to a compact disc player of the Compact Disc digital audio system with reference to the drawings.

FIGS. 1 to 10 are views showing the first embodiment of this invention. The disc reproducing system explained here comprises of a disc case A and reproducing apparatus B. FIGS. 1 to 6 are views showing the construction of the disc case A. FIGS. 7 to 10 are views showing the construction of the reproducing apparatus B.

First, the construction of the disc case A shown in FIGS. 1 to 6 shall be explained. The disc case A is to receive a disc (compact disc) 31, an upper case 32 and lower case 33 of the disc case A are connected with each other so as to be free to open and close and a member rotatably pivoting the disc 31 is arranged within the disc case A. In the upper case 32, front and rear walls 35, 36 and right and left side walls 37, 38 are formed below the peripheral edge of a rectangular top plate 34 and a hole 39 is formed in the center of the top plate 34. In this case, in the rear wall 36, the thickness is larger than in the other walls and the downward projection length is also slightly larger than in other walls. The details of the part in which the hole 39 is formed of the top plate 34 and shown in FIGS. 4 and 5. As shown in these drawings, the part in which the hole 39 is formed of the top plate 34 is expanded downward on the lower surface and the hole 39 consists of an upward opening hole portion 39a, a center hole portion 39b of a diameter slightly smaller than the portion 39a and a downward hole portion 39c slightly smaller in the diameter than the portion 39b and vertically passing through the wall 39. In the following explanation, the part in which the hole portion 39b is formed shall be called a mounting wall 43 and the part in which the hole portion 39c is formed shall be called an engaging wall 44. Also, connecting holes 45 are formed respectively on both right and left sides of the rear wall 36 and engaging holes 46 are formed respectively on the front sides of the side walls 37 and 38 near the front wall 35.

Figure 4:
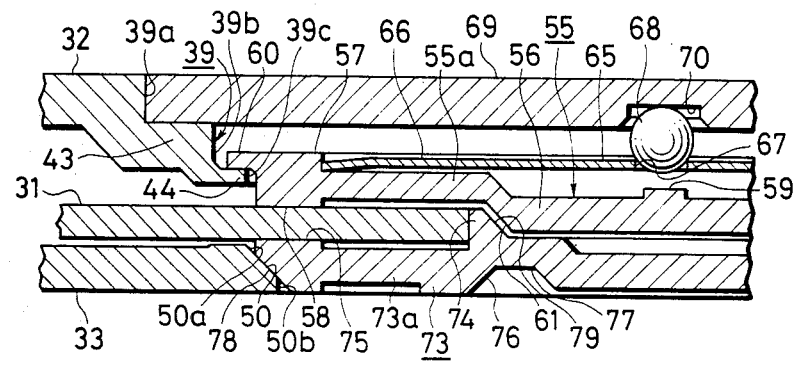
FIG. 4 is an enlarged sectional view along line IV—IV in FIG. 1, showing an important part.
Figure 5:
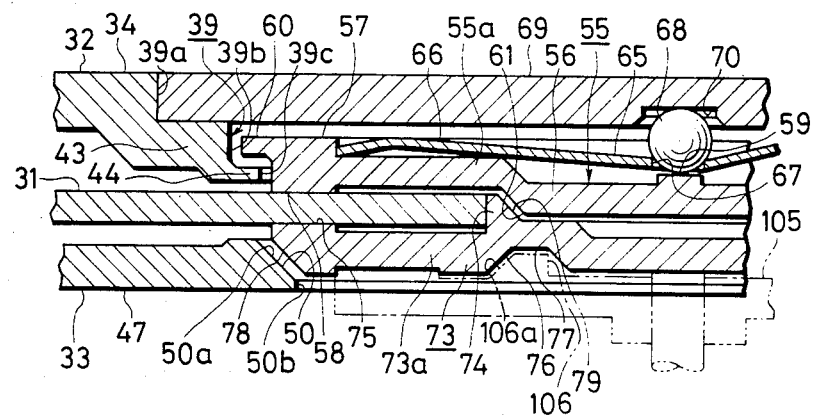
FIG. 5 is an enlarged sectional view along IV—IV in FIG. 1, showing an important part of the reproducing apparatus as the disc case containing the disc is set in a predetermined position.

In the lower case 33, right and left side walls 48, 49 are formed on the upper surfaces of both right and left side edges of a rectangular bottom plate 47. In the bottom plate 47, a hole 50 for inserting a turntable of a reproducing apparatus is formed in the center, and a laser beam introducing aperture 51 is formed. In this case, the side walls 48 and 49 project rearward at the rear ends by a predetermined length from the rear end of the bottom plate 47. Here, the distance between the right and left side walls 48 and 49 is such distance as can receive the upper case 32 as shown in FIG. 1. The length in the front and rear direction of the side walls 48 and 49 is equal to the length in the front and rear direction of the upper case. As shown in FIGS. 4 and 5, the hole 50 in the bottom plate 47 consists of a tapered part 50a becoming gradually smaller in the diameter downward from the upper surface of the bottom plate 47 and the same diameter part 50b of a very slight length connected to this tapered part 50a. Journals 52 which project inwardly are formed repetitively inside the rear end parts of the side walls 48, 49 and hemispheric engaging projections 53 are formed respectively inside the front end parts of the same. Here, engaging projections 53 form a locking mechanism to lock the upper case 32 and lower case 33 in closed state together with the engaging holes 46 in the upper case 32.

The upper case 32 and lower case 33 are connected with each other by positioning the upper case 32 between the right and left side walls 48 and 49 of the lower case 33 and engaging the right and left journals 52 respectively with the right and left connecting holes 45 in the upper case 32, and are free to open and close with the journal 52 as a rotation center. Here, if the cases 32 and 33 are closed, as shown in FIG. 1, the space within the upper case 32 will be closed by the bottom plate 47 of the lower case 33. Also, in this case, the engaging projections 53 of the lower case 33 will engage respectively with the engaging holes 46 of the upper case 32 so that these cases 32 and 33 will not be carelessly opened.

A clamping plate 55 which is one member for clamping the disc 31 is fitted to the upper case 32 and is formed to be disc-shaped. As shown in FIGS. 4 and 5, the central part of the main wall 55a of the clamping plate 55 is a downward expanding engaging part 56. An upwardly projecting annular projecting wall 57 and a downwardly projecting annular clamping wall 58 are formed on the peripheral edge of the main wall 55a, a projection 59 is formed on the upper surface of the center part (the center part of the entire clamping plate 55) of the engaging part 56, an engaging wall 60 projecting radially outward of this clamping plate 55 is formed on the outer periphery of the projecting wall 57 and the outer peripheral part of the lower surface of the engaging part 56 is made as a tapered surface 61. This clamping plate 55 is arranged within the hole portion 39c of the hole 39 as engaged with the upper surface of the engaging wall 44 of the upper case 32.

A thrust spring 65 is fitted on the upper surface of the clamping plate 55, is constructed by forming a plate made of a spring steel to be cruciform, making the tip of each projecting part 66 slightly bent downward and providing a hole 67 formed in the center, and is fitted on the upper surface of the main wall 55a of the clamping plate 55 with the tips of the projecting parts 66 engaged with the inside surface of the projecting wall 57.

A steel ball 68 is mounted on the hole 67 of the thrust spring 65 and is pressed downward by a thrust receiving plate 69 secured to the upper case 32. In this case, a short cylindrical holding recess 70 is formed on the lower surface of the receiving plate 69 and is chamfered on the lower surface to be tapered. The steel ball 68 is held within this holding recess 70. The receiving plate 69 is a curcular plate, is inserted and arranged within the hole portion 39a of the hole 39 in the upper case 32 and is secured on the peripheral edge to the upper case 32 by an adhesive means.

In the construction described above, the clamping plate 55 is rotatable within the hole 39 and is unremovable out of the hole 39 so as not to carelessly slip down from the case. This clamping plate 55 is normally biased downward by the thrust spring 65 so that, in the normal state, its engaging wall 60 will be engaged with the upper surface of the engaging wall 44 of the upper case 32 as shown in FIG. 4. As described later, in case the disc case A is set into the reproducing apparatus, as shown in FIG. 5, this clamping plate 55 will be pressed relatively upward by the turntable 103, the disc 31 will be moved upward as held between the clamping plate 55 and a later described sub-turntable 73 and the engaging wall 60 will be separated from the engaging wall 44. In this state, the clamping plate 55 can rotate, together with the thrust spring 65, with the steel ball 68 contacting the lower surface of the holding recess 70 of the receiving plate 69 as a center.

A sub-turntable 73 is arranged within the hole 50 in the lower case 33, is a disc-shaped member fitting the disc 31 and is also a cap closing the hole 50 in the lower case 33. The diameter of the main wall 73a of this sub-turntable 73 is substantially the same as the diameter of the main wall 55a of the clamping plate 55. In the main wall 73a, an upwardly projecting annular disc mounting wall 74 is formed in the central part of the upper surface thereof, an upwardly projecting clamping wall 75 is formed on the peripheral edge of the upper surface thereof and an annular groove 77 having a tapered surface 76 expanding in the diameter downward is formed on the lower surface thereof. The lower part of the outer peripheral surface of the main wall 73a is a tapered surface 78 becoming smaller in the diameter downward. The disc mounting wall 74 is of such outer diameter as can be inserted into the center hole of the disc 31 without any play and its inside surface is such tapered surface 79 as can be loosely fitted with the tapered surface 61 of the engaging part 56 of the clamping plate 55. This disc mounting wall 74 forms a disc holding part together with the clamping wall 75. The sub-turntable 73 having such form is arranged within the hole 50 of the lower case 33 normally as shown in FIG. 4 with the tapered surface 78 engaged with the tapered surface 50a.

The disc case A constructed as mentioned above is to contain the disc 31 as positioned between the clamping plate 55 and sub-turntable 73.

The construction of the reproducing apparatus B shown in FIGS. 7 to 10 shall be explained in the following. In FIG. 7, the reference numeral 100 represents an outer case. Within the outer case 100, a chassis 103 is arranged along the lower end edge of an opening 102 formed in a front panel 101. As shown in FIG. 9, a motor 104 for driving the disc for rotation is fixed on the lower surface of the chassis 103 and a turntable 105 is fixed to the rotary shaft of the motor 104 projecting upward through a hole formed in the chassis 103. As shown in FIG. 5, the turntable 105 is formed to be disc-shaped and an annular projection 106 having a tapered surface 106a engageable with the groove 76 formed on the lower surface of the sub-turntable 73 of the disc case A is formed on the upper surface of the turntable 105. On the upper surface of the chassis 103, a tray 108 carrying the disc case A from the outside to the inside of the outer case 100 or vice versa is supported, and further a clamper 109 (biasing mechanism) holding in a predetermined position the disc case A carried to the inside of the outer case 100 by the tray 108 is provided.

As shown in FIGS. 7 to 10, the tray 108 is a rectangular plate having a certain thickness. A disc case resting part 110 rectangular in the shape as seen in the plan and having a certain depth for resting the disc case A is formed on the front half part of the upper surface of the tray 108 and a rectangular cut 111 is formed on the rear part. Also, a cut 113 is formed rearward from the central part in the wall 112 forming the disc case resting part 110. This tray 108 is fitted with two lifters 114 lifting and lowering the disc case A rested within the disc case resting part 110 in an interlocking way with the movement of this tray. The lifter 114 comprised of a body 115 with pawls 116 and shafts 117 formed thereon is fitted on the lower surface side of the tray 108 to rotate about the shaft 117 and is biased in the direction in which the pawls 116 rotate upward by a leaf spring 118 fixed to the lower surface of the tray 108. The pawls 116, as rotated upward, project upward of the wall 112 through respective holes 119 formed in the wall 112. These lifters 114 will normally upward support the disc case A carried by the tray 108 and will lower the disc case A onto the turntable 105 only when the disc case A is transported above the turntable 105. The tray 108 thus fitted with the lifters 114 is rested on rollers 121 mounted to the chassis 103 and can move forward and rearward (in the directions indicated by the arrows A and B) in rolling contact with the rollers 121. In such case, the turntable 105 projects slightly upward of the upper surface of the wall 12 of the tray 108 but, as the turntable 105 is positioned within the cut 113 of the tray 108, the turntable 105 does not interfere with the movement of the tray 108. The moving range of the tray 108 is limited between the closing position, in which the turntable 105 is positioned in the center of the disc case resting part 110 indicated by the solid lines in FIG. 7 and the front end surface of the tray 108 closes the opening 102 of the front panel 101, and the opening position, in which the disc case resting part 110 indicated by the two-point chain lines in the same drawing is exposed out of the front panel 101.

As shown in FIG. 9, the clamper 109 is fitted with its rear end part to the rear end part of the chassis 103 so as to be rotatable in the directions indicated by the arrows C and D with the shaft 123 as a center and is biased in the direction indicated by the arrow C by a spring 124 which is interposed between the lower surface of the rear end part of the clamper 109 and the chassis 103. This clamper 109 is rotated in the directions indicated by the arrows C and D in an interlocking way with the movement of the tray 108 by the operation of a driving mechanism 125 explained in the following. When the tray 108 is moved to the closing position (in the direction indicated by the arrow B), the clamper 109 will rotate in the direction indicated by the arrow C, will push the lifters 114 with projections 126 formed on the lower surface of the clamper 109 to lower the pawls 116 and will simultaneously downward press the disc case A supported by the pawls 116 within the disc case resting part 110 and the disc case A will be held between the clamper 109 and the turntable 105.

The driving mechanism 125 consists of a motor, gear train and cam, etc., carries the tray 108 and thus moves the clamper 109 in an interlocking way with the movement of this tray 108, and moves the lifters 114 through this clamper 109.

As shown in FIG. 9, the chassis 103 is provided with an optical head 127 reading out the signal information data recorded on the disc 31.

In the above mentioned reproducing apparatus B, the carrying operation of the tray 108, playing operation and stopping operation, etc. are to be made by manipulating operating buttons not illustrated.

The handling and operation of the disc reproducing system mentioned above shall be explained in the following.

First, the method of handling the disc case A shall be explained. In order to receive the disc 31 in the disc case A, the upper case 32 and lower case 33 are held separately and are rotated to be opened with the journal 52 as a center, and then the disc 31 is mounted on the upper surface of the sub-turntable 73 arranged within the hole 50 of the lower case 33. That is to say, the disc mounting wall 74 of the sub-turntable 73 is inserted relatively into the center hole of the disc 31. And the upper and lower cases 32 and 33 are rotated with the journal 52 as a center to be closed as shown in FIG. 1. Here, by the engagement of the engaging projection 53 of the lower case 33 with the engaging hole 46 of the upper case 32, the upper and lower cases 32 and 33 will be locked in closed state.

The disc 31 received within the disc case A as mentioned above will be clamped between the clamping wall 75 of the sub-turntable 73 and the clamping wall 58 of the clamping plate 55 as mounted to the disc mounting wall 74 of the sub-turntable 73 as shown in FIG. 4. That is to say, the clamping plate 55 mounted to the upper case 32 will be normally downward biased by the thrust spring 65, will therefore force the disc 31 against the clamping wall 75 of the sub-turntable 73 with its clamping wall 58, will thereby force the tapered surface 78 of the sub-turntable 73 against the tapered part 50a of the lower case 33 and will clamp the disc 31 in cooperation with the sub-turntable 73. In the case of downward pressing the disc 31, the clamping plate 55 will loosely fit the engaging part 56 within the disc mounting wall 74 of the sub-turntable 73. Here, as the outer peripheral surface of the engaging part 56 and the inner surface of the disc mounting wall 74 are respectively the tapered surfaces 61 and 79, even if the clamping plate 55 and the sub-turntable 73 are eccentric from each other, the tapered surfaces 61 and 79 will guide each other to center the clamping plate 55 and sub-turntable 73 with each other. Thus the disc 31 is clamped and held by the clamping plate 55 and sub-turntable 73 as mentioned above so as not to accidentally move within the disc case A.

In taking the disc 31 out of the disc case A containing the disc 31 as mentioned above, in the order reverse to the above, the upper case 32 and lower case 33 may be opened and the disc 31 may be taken out of the sub-turntable 73. Thus, in this disc case A, the disc can be replaced with respect to the case.

The procedure of reproducing the disc 31 shall be explained in the following. First, the disc 31 is received into the disc case A as mentioned above. Then the operating button (not illustrated) for drawing the tray out of the reproducing apparatus B is operated to start the driving mechanism 125, the tray 108 is carried in the direction indicated by the arrow A, is drawn out of the opening 102 of the front panel 101 and is brought to the opening position indicated by the two-point chain lines in FIG. 7 and the disc case resting part 110 is exposed out. The driving mechanism 125 for carrying the tray 108 rotates the clamper 109 in the direction indicated by the arrow D in synchronization with the movement of the tray 108 to bring the clamper 109 to the upper limit position indicated by the two-point chain lines in FIG. 9. When the clamper 109 rotates in the direction indicated by the arrow D, the press-down operation of the projections 126 on the lifters 114 will be released and the lifters 114 will be rotated by the force of the spring 118 and the pawls 116 of the lifters 114 will project upward within the disc case resting part 110. In this state, the disc case A containing the disc 31 is inserted into the disc case resting part 110. Therefore, the disc case A inserted into the disc case resting part 110 as mentioned above will be supported as lifted to a certain height by the pawls 116.

Then, when the operating button (not illustrated) for receiving the tray is operated, the tray 108 will be carried in the direction indicated by the arrow B by the driving mechanism 125 and will be brought to the closing position indicated by the solid lines in FIG. 7. In this time, the disc case A positioned within the disc case resting part 110 will have been lifted by the pawls 116 of the lifters 114 and will therefore move together with the tray 108 without colliding with the turntable 105 projecting within the disc case resting part 110. When the tray 108 approaches the closing position, the driving mechanism 125 will make the clamper 109 follow the cam so as to be rotated in the direction indicated by the arrow C by the force of the leaf spring 118. The clamper 109 rotating in the direction indicated by the arrow C will rotate the lifters 114 with the projections 126 to lower pawls 116, will contact in the tip part with the upper surface of the disc case A and will downward press, the disc case A. When the tray 108 reaches the closing position, the pawls 116 of the lifters 114 will lower and the disc case A will lower. At this time, as shown in FIG. 5, the disc case A will be so positioned that the center of the inserting hole 50 of the lower case 33 will coincide with the center of the turntable 105 and will be pressed downward by the clamper 109 so as to advance the turntable 105 relatively into the hole 50. In this case, the turntable 105 will contact the lower surface of the sub-turntable 73 closing the hole 50 and will relatively lift by a certain height the sub-turntable 73, disc 31 and clamping plate 55 against the biasing force of the thrust spring 65. When the turntable 105 contacts the sub-turntable 73, the annular projection 106 of the turntable 105 will engage with the groove 77 of the sub-turntable 73. In this case, the tapered surface 106a will guide the tapered surface 76 to center the sub-turntable 73, that is, the disc 31 with the turntable 105. When the tray 108 is thus placed in the closing position, the disc case A will be held between the clamper 109 and the turntable 105 with the sub-turntable 73 in contact with the turntable 105. In this state, as shown in FIG. 5, the disc 31 will be positioned at a certain distance from the top plate 34 of the upper case 32 and the bottom plate 47 of the lower case 33. The engaging wall 60 of the clamping plate 55 will be positioned as separated upward by a certain distance from the engaging wall 44 of the upper case 32, and the tapered surface 78 of the sub-turntable 73 will be also positioned as separated upward by a certain distance from the tapered part 50a of the lower case 33. Also, in this state, the clamping plate 55 and subturntable 73 will be relatively pressed by the turntable 105, therefore the biasing force of the thrust spring 65 will become stronger and the disc 31 will be clamped with a stronger force.

In this system, after the tray 108 is brought to the closing position as mentioned above, the disc 31 will be able to be reproduced.

Figure 6:
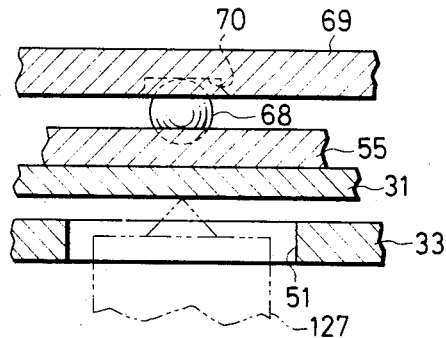
FIG. 6 is an enlarged sectional view along line VI—VI in FIG. 1, showing a laser beam introducing hole part wherein the disc case is set in the reproducing apparatus.

In order to reproduce the disc 31, the playing button (not illustrated) is operated to start the motor 104 and rotate the turntable 105. When the turntable 105 rotates, the torque will be transmitted to the disc 31 side, and the disc 31 will rotate together with the subturntable 73, clamping plate 55, thrust spring 65 and steel ball 68. Here, as shown in FIG. 6, the optical head 127 will emit a laser beam to the disk 31 through the laser beam introducing aperture 51 formed in the lower case 33 of the disc case A, the reflected beam by the disc 31 will be again detected and thus the signal (information data) recorded on the disc 31 will be read out. This signal will be reproduced as an audio signal through a reproducing circuit, amplifier, etc. not illustrated.

As mentioned above, this disc reproducing system is constructed in a such way that the disc 31 is contained within the disc case A, the reproducing apparatus B is loaded with the disc case A containing the disc 31 and the disc 31 is reproduced. Therefore, in this system, once the disc 31 is contained within the disc case A, the disc 31 will be able to be handled by holding the disc case A, that is, the reproducing apparatus will be able to be loaded and unloaded with the disc 31 while holding the disc case A. As a result, in handling the disc 31, even if the disc case A accidentally collides with the reproducing apparatus B or the like, the disc 31 will not be subjected directly to the external force and will be able to be prevented from being damaged. Further, as the disc 31 will not be held directly with a hand, the disc 31 will be able to be prevented from depositing a finger print on it. Furthermore, as the disc case A covers substantially all the range of the outside of the disc 31, the disc 31 will be able to be prevented from depositing dusts on it and to be protected from a high temperature. Particularly, in the above mentioned system, as the turntable 105 normally closes with the sub-turntable 73 the hole 50 through which the turntable 105 will be inserted when the disc in the disc case A is to be reproduced, dusts will be able to be positively prevented from entering the disc case A through the hole 50.

In the construction of the above mentioned system, such members except the thrust spring 65 and steel ball 68 of the disc case A as, for example, the cases 32, 33 etc. are preferably made of plastics because of manufacture easiness. In such case, these members may be either transparent or non-transparent but, if they are made entirely or partly transparent, there will be an advantage that the index and the like of the contained disc will be seen from outside.

In such antifriction means as coating the inside surfaces of the upper case 32 and lower case 33 of the disc case A with tetrafluoro-ethylene or painting the same inside surfaces with a lubricant is applied, even if the disc accidentally comes into sliding contact with the inside surface of the case, the disc will be able to be prevented from being damaged.

The disc case as described above can be variously modified on the basis of the construction of the above mentioned disc case A.

For example, the laser beam introducing aperture 51 formed in the lower case 33 may be so formed as to be closed with a transparent plate. If it is formed in such way, dusts will be able to be more positively prevented from coming in and the disc will be able to be more positively protected from an external force and a high temperature.

Also, the mechanism of locking the upper case 32 and lower case 33 when closed is not limited to the projection-hole engaging construction at the front end of each of both right and left sides as mentioned above but may be provided in either of both case engaging parts. Further, both closed cases may be locked in with a lock pin or an engaging piece and engaged piece of proper shapes may be provided respectively in both cases to be engaged with each other to lock the cases.

The construction of engaging the sub-turntable 73 with the lower case 33 may not be such a construction of engaging only the tapered surfaces with each other as is mentioned above but may be a construction of the same construction as the construction of engaging the clamping plate 55 with the upper case 32, that is to say, engaging walls are formed on both of the sub-turntable 73 and lower case 32 and are engaged with each other.

Further, in the above mentioned embodiment, the reproducing apparatus is so constructed as to be loaded and unloaded with the disc case by the tray provided in the reproducing apparatus. However, the present invention is not limited to this construction. A slit-shaped inserting part for inserting the disc case may be provided in the reproducing apparatus so that, when the disc case is inserted into the slit, the disc case will be automatically set in the position in which the disc can be played and an ejecting mechanism may be provided so that, when it is operated, the disc case will be ejected out of the reproducing apparatus.

FIGS. 11 to 26 are views showing the second embodiment of the present invention. FIGS. 11 to 23 are views showing the construction of the entire system as a reproducing apparatus B is loaded with a disc case A and the construction of the details. FIGS. 24 to 26 are views showing the construction of the disc case A.

First, the construction of the disc case A shown in FIGS. 24 to 26 shall be explained. The disc case A is constructed to receive a disc (compact disc) 231 by connecting an upper case 232 and lower case 233 with each other so as to be free to open and close and arranging within it a member rotatably pivoting the disc 231. The upper case 232 has a front wall 235 and right and left walls 237 and 236 on the lower surface of the peripheral edge part of a rectangular top plate 234. Guide grooves 238 and 239 are formed respectively on the outside surfaces of the side walls 236 and 237. A rack 240 is formed on the bottom surface of the front part of the guide groove 238 (and is shown in detail in FIG. 26). A recess 241 is formed on the bottom surface of the middle part of the forward and rearward directions of the guide groove 239. A clamper 242 is mounted to the central part of the lower surface of the top plate 234. This clamper 242 is a disc-shaped member rotatably holding the disc 231 in cooperation with a later discribed sub-turntable and is rotatably mounted to the lower surface of the top plate 234.

The lower case 233 has a rear wall 245 on the upper surface of the rear end edge part of a rectangular bottom plate 244. In the bottom plate 244, a turntable inserting hole 246 is formed in the central part, a laser beam introducing aperture 247 is formed on the front side of the bottom plate 244 and two location pin engaging holes 248 are formed on the rear side of the bottom plate 244. A sub-turntable 249 is rotatably arranged in the hole 246, is a disc-shaped member and has an annular mounting wall 250 for mounting the disc 231 in its central part. This sub-turntable 249 is engaged with the hole 246 so as not to drop downward, is prevented by a pressing member 251 fixed to the bottom plate 244 from separating upward and is so arranged as to be slightly movable in the vertical direction.

The upper case 232 and lower case 233 are connected with each other so as to be free to open and close by engaging journals (not illustrated) formed respectively on the inside surfaces of the rear end parts of the side walls 236 and 237 of the upper case 232 respectively with holes (not illustrated) formed respectively in both left and right end parts of the rear wall 245 of the lower case 233. When these cases 232 and 233 are closed as shown in FIG. 25, respective projections and holes (not illustrated) provided in proper places of these cases will engage with each other so that the cases will not accidentally open.

The disc case A constructed as mentioned above is to receive the disc 231 as positioned between the clamper 242 and sub-turntable 249.

Figure 19A:
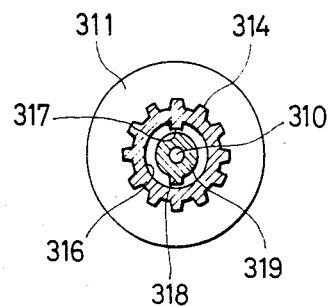
FIGS. 19a and 19b are sectional views showing the details of a pinion part.
Figure 19B:
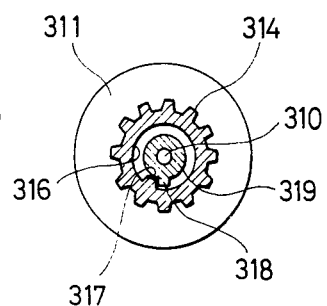

The construction of the reproducing apparatus B shall be explained in the following. In FIGS. 11 to 18, the reference numeral 300 represents an outer case of the reproducing apparatus B in which a chassis 303 is arranged along an opening formed in a front panel 301. A disc motor 304 is mounted to the central part of the lower surface of the chassis 303. A turntable 306 is fixed to a rotary shaft 305 projecting upward from the upper surface of the chassis 303, is a disc-shaped member and can engage with the sub-turntable 249 through the hole 246 of the disc case A so as to be able to transmit a torque. Also, a loading motor 307 is mounted to one side part of the lower surface of the chassis 303, and a pulley 309 of a small diameter is fixed to a rotary shaft 308 of the motor 307 projecting upward from the upper surface of the chassis 303. Further, a shaft 310 is arranged so as to project upward in the rear of the rotary shaft 308 on the chassis 303, and is rotatably pivoted by a bearing (not illustrated) mounted to the chassis 303. A pulley 311 of a large diameter is fixed to the lower end of the shaft 310. A belt 312 is extended round the pulleys 309 and 311 so that the torque of the motor 307 may be transmitted to the shaft 310. A pinion 314 is vertically movably and rotatably mounted to the upper end of the shaft 310 as prevented by a retainer 313 from disengaging upward and is upward biased by a clutch spring 315 wound around the shaft 310. In the pinion 314, the lower part of the hole through which the shaft 310 is inserted is constructed by a hole 316 of a large diameter having a certain gap between the pinion 314 and the shaft 310 as shown in FIGS. 19a, 19b, and a projection 317 is formed on the inside surface of the hole 316. On the shaft 310 is fixed an engaging member 319 having a projection 318 which is engageable with the projection 317. In this construction, when the projection 318 engages with the projection 317, the torque of the shaft 310 will be transmitted to the pinion 314.

On the chassis 303, right and left location pins 325 are fixed on the upper surface of the front end part and further a housing 326 is supported.

Figure 11:
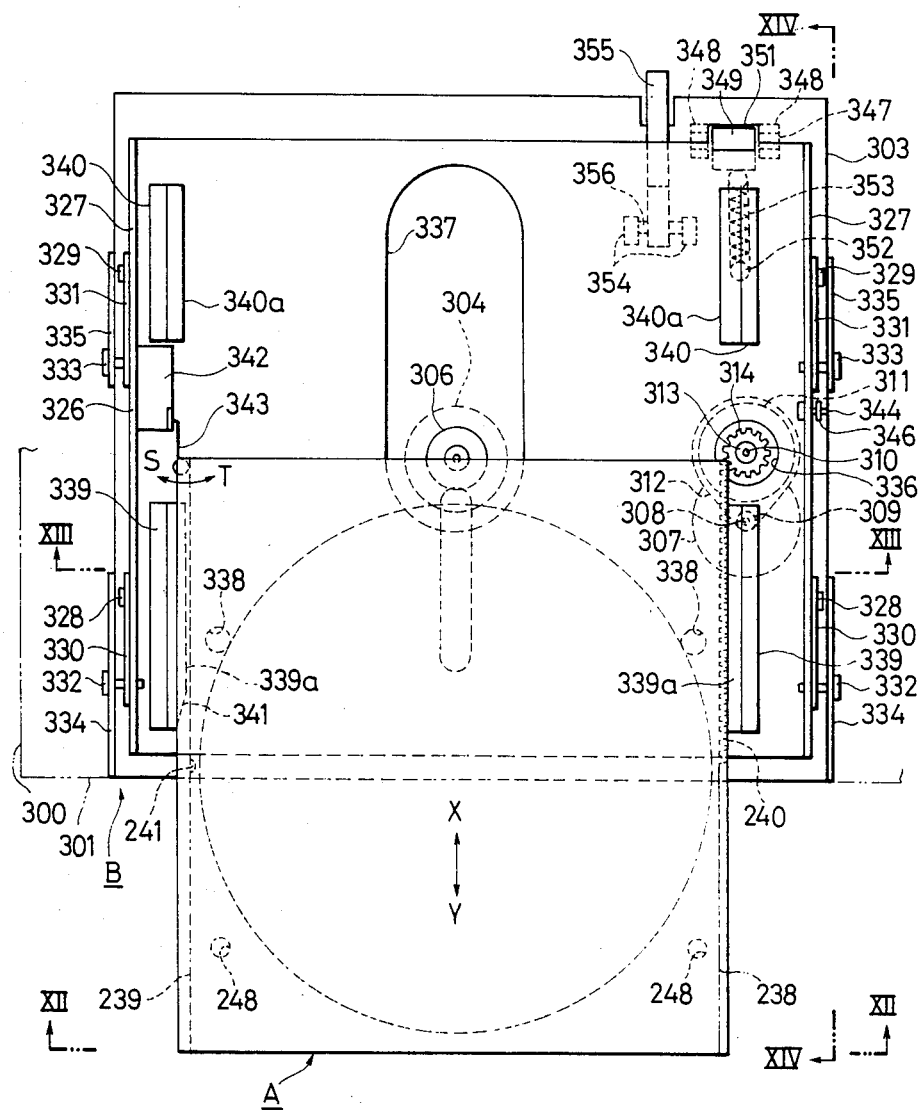
FIG. 11 is a plan view showing an important part of the second embodiment as the disc case is inserted in the reproducing apparatus.
Figure 12:
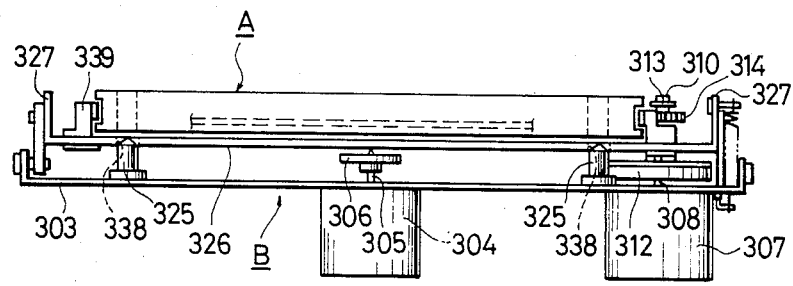
FIG. 12 is an elevation as seen along line XII—XII in FIG. 11.
Figure 13:
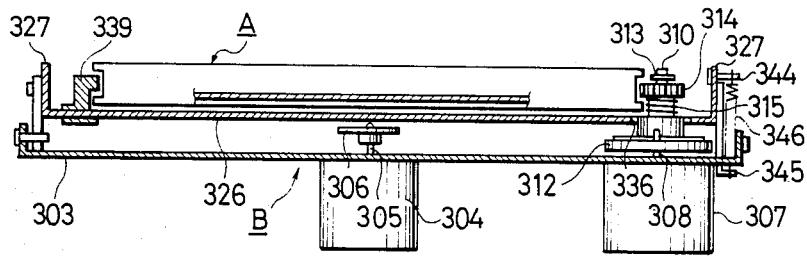
FIG. 13 is a sectional view along line XIII—XIII in FIG. 11.
Figure 15:
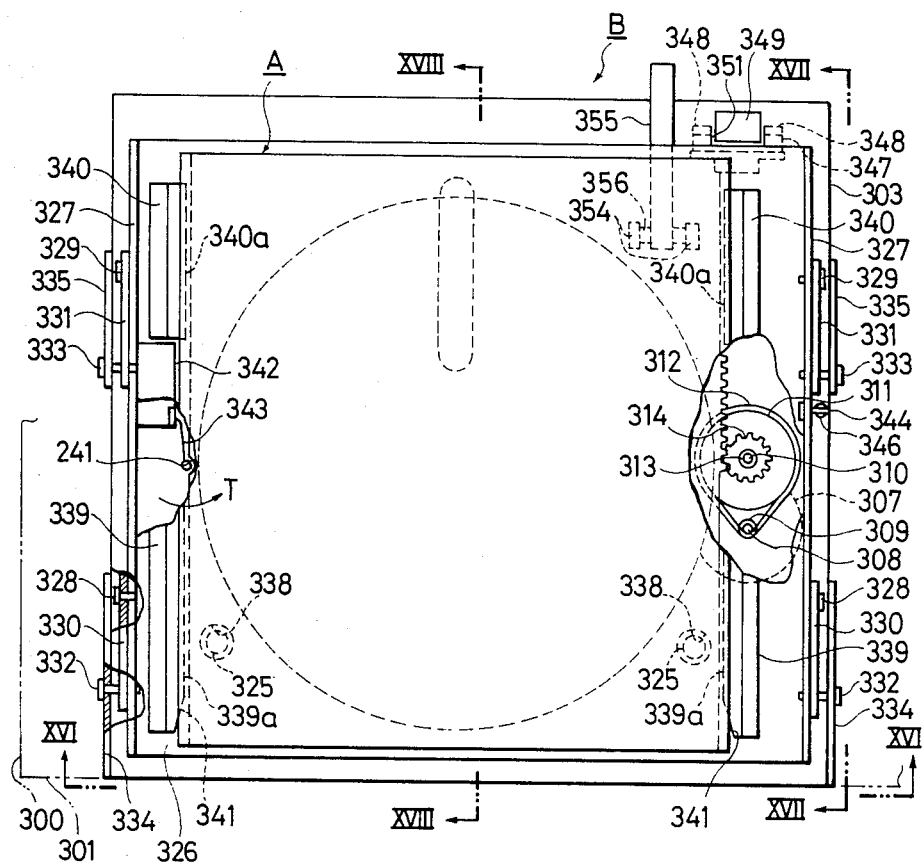
FIG. 15 is a plan view showing an important part of the reproducing apparatus as the disc case is set in a predetermined position.
Figure 16:
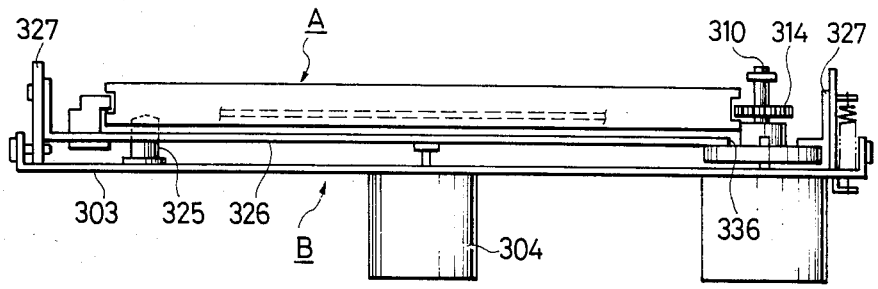
FIG. 16 is an elevation as seen along line XVI—XVI in FIG. 15.
Figure 20:
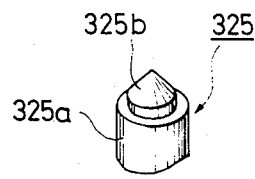
FIG. 20 is a perspective view showing an important part of a location pin.
Figure 21:
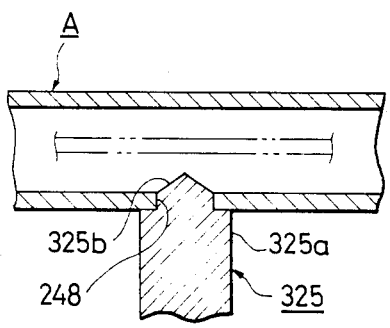
FIG. 21 is a sectional view showing the engagement of the location pin and disc case with each other.

The location pins 325 are cylindrical members positioning the case A when the reproducing apparatus B is loaded with the disc case A, has an engaging part 325b of a small diameter tapered at the upper end in the upper part of a body 325a of a large diameter as shown in FIG. 20 so that the engaging part 325b may fit in the engaging hole 248 of the disc case A as shown in FIG. 21. The housing 326 is constructed by forming bends 327 on both right and left sides of a rectangular plate, and links 330 and 331 are rotatably mounted at one end respectively via pins 328 and 329 to the front and rear end parts of the right and left bends 327 and at the other end respectively via pins 332 and 333 to front and rear bends 334 and 335 formed right and left sides of the chassis 303. In this construction, the housing 326 rotates the links 330 and 331 and is free to separate from and contact with the chassis 303. In the housing 326, are formed a hole 336 for positioning the pinion 314 on the upper surface side of the housing 326, an aperture 337 for bringing the turntable 306 to the same upper surface side of the housing 326 and for passing a laser beam of the optical head (not illustrated) mounted be the chassis 303, and holes 338 through which the location pins 325 can be respectively inserted. In this housing 326, guide members 339 and 340 are fixed respectively to both right and left side parts on its upper surface, for guiding the disc case A to the predetermined position on the upper surface of the housing 326 when the reproducing apparatus is to be loaded with the disc case A. The guide members 339, 340 are so constructed that projections 339a and 340a may fit respectively in the guide grooves 238 and 239 of the disc case A as shown in FIGS. 11, 15 and 22. The projection 339a of the guide member 339 has a sloped surface 341 in the front end part. A microswitch 342 positioned between the guide members 339 and 340 so as to control the loading motor 307 to be on or off is mounted to the left side part of the upper surface of the housing 326. The microswitch 342 is to be switched when the tip of its actuator 343 contacts the bottom surface of the guide groove 239 of the disc case A or when the tip fits in a recess 241 formed there as shown in FIGS. 11, 15 and 23. The housing 326 is biased downward by a clamping spring 346 tensed between a pin 344 fixed to the bend 327 of the housing 326 and a pin 345 fixed to the chassis 303.

Figure 14:
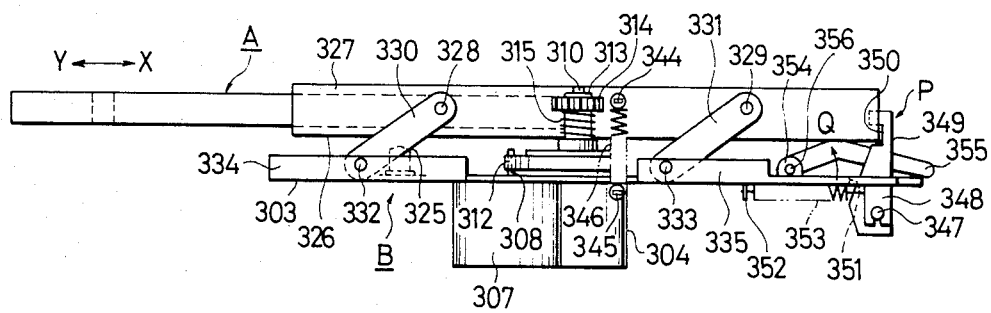
FIG. 14 is a side view as seen along line XIV—XIV in FIG. 11.
Figure 17:
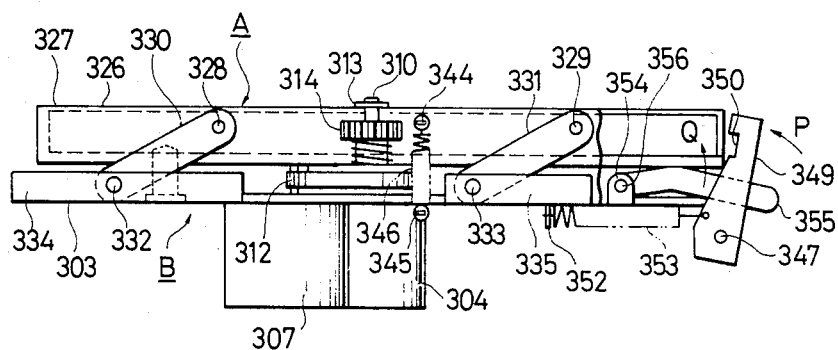
FIG. 17 is a side view as seen along line XVII—XVII in FIG. 15.
Figure 18:
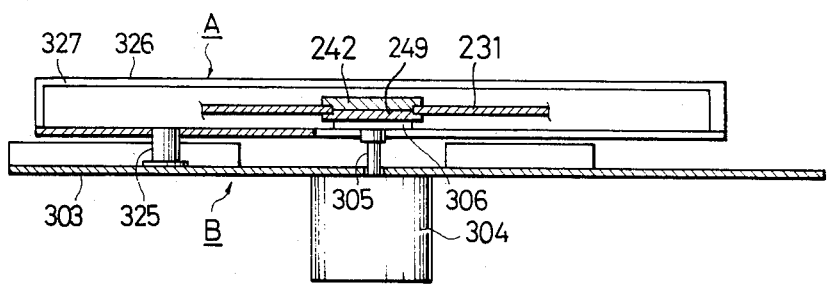
FIG. 18 is a sectional view along line XVIII—XVIII in FIG. 15.

A supporting member 348 rotatably supporting a shaft 347 is fixed to the lower surface of the rear end part of the chassis 303. A locking plate 349 is fixed to the shaft 347, which projects on the upper surface side of the chassis 303 through a hole 351, in the upper end part of which an engaging recess 350 is formed and the locking plate 349 is biased in the direction indicated by the arrow P as shown in FIGS. 14 and 17 by a locking spring 353 tensed between the lower end part of the locking plate 349 and a projection 352 formed on the chassis 303. The locking plate 349 is to lock the housing 326 in position by engaging the engaging recess 350 with its rear end edge when the housing 326 is moved upward. On the upper surface of the rear end part of the chassis 303, an ejecting lever 355 is rotatably mounted by a shaft 356 to a supporting member 354 fixed to the upper surface of the chassis 303. This ejecting lever 355 is to move the housing 326 upward with its bent part in contact with the lower surface of the housing 326 when it is driven by a driving mechanism no illustrated to rotate in the direction indicated by the arrow Q.

In this reproducing apparatus B, the disc reproducing playing operation and stopping operation and the disc case ejecting operation, etc. are to be made by manipulating operating buttons not illustrated.

The handling method and operation of the disc reproducing system as mentioned above shall be explained in the following.

First, the handling of the disc case A shall be explained. In order to receive the disc 231 in the disc case A, the upper case 232 and lower case 233 are respectively separately held and are opened, the mounting wall 250 of the sub-turntable 249 is inserted relatively into the center hole of the disc 231, the disc 231 is placed on the sub-turntable 249 and then the cases 232 and 233 are closed. The disc 231 contained within the disc case A will be clamped between the clamper 242 and sub-turntable 249 so as not to accidentally move within the case. In such case, the hole 246 will be closed by the sub-turntable 249. In this disc case A, if the upper and lower cases 232 and 233 are opened and the procedure reverse to the above is taken, the disc 231 will be able to be taken out and replaced.

The procedure of reproducing the disc 231 shall be explained in the following. First, as mentioned above, the disc 231 is received in the disc case A and this disc case A is inserted in the direction indicated by the arrow X in FIG. 11 into the reproducing apparatus B through the opening formed in the front panel 301 of the reproducing apparatus B.

In the reproducing apparatus B, at first as shown in FIGS. 11 to 14 the rear end edge of the housing 326 will engage with the engaging recess 350 of the locking plate 349 and the housing 326 will be set in a raised position. The disc case A will be inserted to a position wherein the projections 339a of the right and left guide members 339 are fitted respectively in the guide grooves 238 and 239, with this projections as guides, as shown in FIG. 11, the bottom surface of the rear end part of the guide groove 239 contacts the actuator 343 of the microswitch 342 and the rear end part of the rack 240 formed in the guide groove 238 contacts the pinion 314. In inserting the disc case A, as the tip part of the bottom surface of the guide member 339 is constructed as the sloped surface 341, the guide members 339 will be able to be smoothly engaged respectively with the guide gooves 238 and 239.

When the actuator 343 of the microswitch 342 contacts the bottom surface of the guide groove 239, this actuator 343 will move in the direction indicated by the arrow S in FIG. 11, the switch 342 will be turned on and thereby the control circuit not illustrated will turn on the loading motor 307. When the loading motor 307 is turned on, its torque will be transmitted to the shaft 310 and engaging member 319 via the pulley 309, belt 312 and pulley 311 to rotate them clockwise in FIGS. 11 and 19. Here, as the projection 318 of the engaging member 319 is at first positioned as separated in the rotating direction from the projection 317 of the pinion 314, the engaging member 319 will rotate for a while with the projection 318 not in contact with the projection 317 as shown in FIG. 19a and will not rotate the pinion 314 during this while. If the projection 318 becomes to contact with the projection 317, the pinion 314 rotate in the state as shown in FIG. 19b and thereby mesh with the rack 240 to further move the disc case A in the direction indicated by the arrow X. Thus, after the loading motor 307 starts, with a certain time lag, the pinion 314 rotates. Therefore, the initial meshing of the pinion 314 with the rack 240 will be able to be made smoothly.

Thereafter, the disc case A will be further moved in the direction indicated by the arrow X as guided by the guide members 339 and 340 and will push the upper end part of the locking plate 349 to rotate the locking plate 349 and disengage the engaging recess 350 with the housing 326 when the end surface of the disc case A reaches the rear end part of the housing 326. When the disc case A reaches this position, the tip part of the actuator 343 of the microswitch 342 engages with the recess 241 formed in the guide groove 239, and the actuator 343 is moved in the direction indicated by the arrow T to turn the switch and thereby the control circuit will stop the rotation of the loading motor 307.

When the locking plate 349 is disengaged with the housing 326 as mentioned above, as shown in FIGS. 15 to 18, the links 330 and 331 are rotated by the biasing force of the clamping spring 346 to downward move the housing 326 with holding the disc case A. At this time, the turntable 306 advances relatively into the case through the hole 246 of the disc case A, and engages the lower surface of the sub-turntable 249 so as to be able to transmit a torque to the sub-turntable 249. As the sub-turntable 249 is pressed upward by the turntable 306, the disc 231 within the disc case A is strongly clamped between the sub-turntable 249 and clamper 242. The right and left location pins 325 project upward respectively through the holes 338 of the housing 326, and the engaging part 325b engages with the engaging hole 248 of the disc case A as shown in FIG. 21. When the disc case A lowers together with housing 326, the pinion 314 positioned within the guide groove 238 also lowers together with the disc case A. Thus the disc case A is inhibited to move vertically and horizontally and is placed in a predetermined position in which the disc can be played.

Here, if the playing button is operated, the disc motor 304 will be turned on to rotate the turntable 306, and its torque will be transmitted to the sub-turntable 249 to rotate the disc 231. Here, the optical head will emit a laser beam to the disc 231 through the aperture 247 and the reflected beam by the disc 231 will be detected to read out the signal (information data) recorded on the disc 231. This signal will be reproduced as an audio signal via the reproducing circuit and amplifier not illustrated.

In order to take out the disc case A after the end of the reproduction of the disc 231, the ejecting button is operated. When the button is operated, the ejecting lever 355 will be rotated in the direction indicated by the arrow Q by the driving mechanism not illustrated, and the housing 326 will be lifted by this ejecting lever 355. When this housing 326 reaches a certain height, the locking plate 349 biased by the locking spring 353 will engage the rear end edge of the housing 326 with its recess 350. Here, the housing 326 will stop rising and will be held in the above described raised position. In this case, the location pins 325 and turntable 306 will separate from the disc case A and the pinion 314 will rise together with the disc case A. Here, the control circuit will turn on the loading motor 307 to rotate in the direction opposite to that described above. When the motor 307 thus rotates, the shaft 310 and engaging member 319 will rotate counterclockwise, the pinion 314 will rotate in this direction, the disc case A, by the rack 240 meshed with the pinion 314, will be carried in the direction indicated by the arrow Y, and a part of the case will be pushed out of the outer case 300. When the actuator 343 of the microswitch 342 separates from the disc case A, the control circuit will stop the rotation of the loading motor 307.

As the first embodiment system, this second embodiment system can be also protected from an external force, finger print, dusts and high temperature.

Also in this system, as a mechanism of carrying the disc case A is constructed in such way that the pinion 314 is provided on the reproducing apparatus B and the rack 240 is formed on the disc case A, the construction of the automatic loading mechanism for the disc is very simple.

Figure 27:
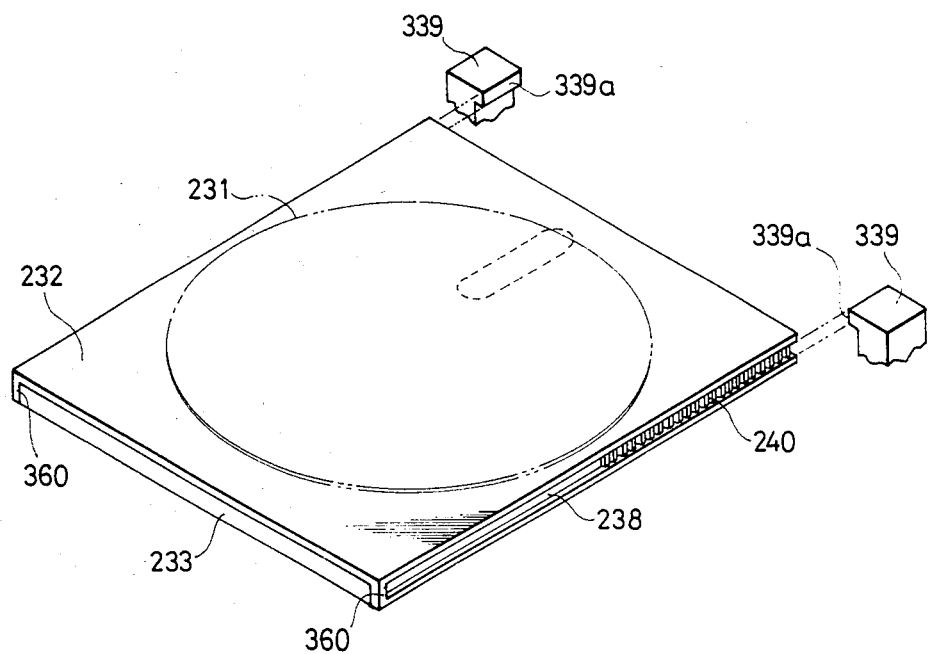
FIG. 27 is a perspective view showing another example of the disc case.
Figure 28:
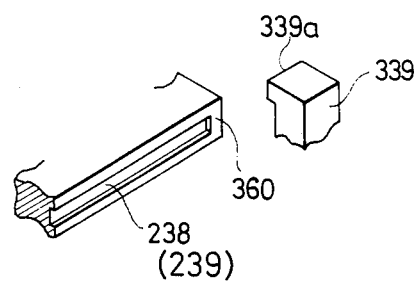
FIG. 28 is an enlarged perspective view of the stopper mechanism in FIG. 27.

FIG. 27 is a view showing another example of the disc case. In the disc case shown in this drawing, in addition to the construction of the above mentioned disc case A, stop pieces 360 are formed respectively at the rear ends of the guide grooves 238 and 239. According to this disc case, as shown in FIG. 28, if the disc case is to be inserted into the reproducing apparatus B with its rear end side, the stop piece 360 will contact the projection 339a of the guide member 339 to prevent the insertion of the case and thereby the disc case can be prevented from being inserted in appropriately.

In the above mentioned embodiment, the location pin engaging holes formed in the disc case are made only in the lower case but may be made also to pass through the upper case if both surfaces of the disc are used.

The position of the disc case may be detected by the microswitch not only from the side of the disc case but also from any other side, for example, by arranging the microswitch above the disc case and providing the detected part on the upper surface of the disc case.

Further, in the above mentioned embodiment, the joint of the pinion 314 with the shaft 310 may be a mere spline joint.

What is claimed is:

1. A disc reproducing apparatus for reproducing a disc on which optical information data are recorded and which is received in a disc case, said reproducing apparatus being able to receive said disc case with said disc received in said disc case, wherein when said reproducing apparatus receives said disc case with the disc, while said reproducing apparatus holds said disc case in a fixed position to the reproducing apparatus within said reproducing apparatus, said reproducing apparatus drives said disc in rotation and reproduces said optical information data, said reproducing apparatus comprising a turntable which is engageable with said disc through an insert opening of said disc case to drive said disc in rotation, a pick-up head which accesses said disc through an aperture of said disc case, said optical information data recorded on said disc being optically reproduced by said pick-up head, and a disc case carrying mechanism which carries said disc case in cooperation with said disc case so that said reproducing apparatus is loadable and unloadable with said disc case, said disc case carrying mechanism comprising a pinion and said disc case including a rack formed on the surface of said disc case and engageable by said pinion to effect movement of said disc case.

2. A disc reproducing apparatus according to claim 1, wherein said reproducing apparatus comprises a disc case holder which holds detachably said disc case in position within said reproducing apparatus.

3. A disc reproducing apparatus according to claim 1, wherein said reproducing apparatus comprises a pressing member wich forces said disc in said disc case toward said turntable so that a torque can be transmitted from said turntable to said disc.

4. A disc reproducing apparatus according to claim 1, wherein said reproducing apparatus comprises a pressing member which forces said disc case toward said turntable so that said disc in said disc case is forced toward said turntable.

5. A disc reproducing apparatus according to claim 2, wherein said disc case holder comprises a tray which is retractable and drawable into the interior of said reproducing apparatus and said holder including a disc case resting portion, said tray carrying said disc case between a position out of said reproducing apparatus and a determined position inside of said reproducing apparatus.

6. A disc reproducing apparatus according to claim 1, wherein said disc case carrying mechanism further comprises:
driving means for driving said pinion, and
a clutch mechanism which is interposed between said driving means and said pinion.

7. A disc reproducing apparatus according to claim 1, wherein said disc case carrying mechanism comprises a guide member which guidingly carries said disc case in cooperation with the guide groove of said disc case.

8. A disc reproducing apparatus according to claim 1, wherein said disc case carrying mechanism further comprises a outside member which guides to carry said disc case in cooperation with the guide groove of said disc case, and wherein said rack is formed on the base of said guide groove, said pinion engaging with said rack in said guide groove.

9. A disc reproducing apparatus according to claim 8, wherein said disc case carrying mechanism comprises a disc case position sensor which senses a sensing part formed on said disc case so that a positioning of said disc case in the determined position is detected when loading said disc case.

10. A Disc reproducing apparatus according to claim 9, wherein said disc case position sensor is constructed as a switch having an actuator which is actuated by said sensing part formed on said disc case, said switch being disposed fixedly inside said reproducing apparatus.

11. A disc, reproducing apparatus for reproducing a disc on which optical information data are recorded and which is received in a disc case, said reproducing apparatus being able to receive said disc case with said disc received in said disc case, wherein when said reproducing apparatus receives said disc case with the disc, while said reproducing apparatus holds aaid disc case in a fixed position to the reproducing apparatus within said reproducing apparatus, said reproducing apparatus drives said disc in rotation and reproduces said optical information data, said reproducing apparatus comprising a turntable and a sub-turntable engaged by said turntable, said sub-turntable being arranged within said disc case and engageable with said disc, with said turntable driving said disc in rotation via said sub-turntable, said reproducing apparatus further including a pick-up head which accesses said disc through an aperture of said disc case, said optical information data recorded on said disc being optically reproduced by said pick-up head, and a disc case carrying mechanism which carries said disc case in cooperation with said disc case so that said reproducing apparatus is loadable and unloadable with said disc case, said disc case carrying mechanism comprising a pinion and said disc case including a rack formed on the surface of said disc case and engageable by said pinion to effect movement of said disc case.

* * * * *

UNITED STATES PATENT AND TRADEMARK OFFICE
CERTIFICATE OF CORRECTION

PATENT NO. : 4,627,037
DATED : Dec. 2, 1986
INVENTOR(S) : TAMARU et al

It is certified that error appears in the above-identified patent and that said Letters Patent is hereby corrected as shown below:

In the claims,

Claim 8, column 16, line 23, change "outside" to --guide--.

Claim 11, column 16, line 39, after "disc" delete --,--.

Signed and Sealed this

Twenty-sixth Day of January, 1988

Attest:

DONALD J. QUIGG

Attesting Officer  Commissioner of Patents and Trademarks